United States Patent
Scholder et al.

(10) Patent No.: US 12,449,069 B2
(45) Date of Patent: Oct. 21, 2025

(54) PROCESS CONNECTION, SENSOR ASSEMBLY AND PROCESS PLANT

(71) Applicant: SICK AG, Waldkirch (DE)

(72) Inventors: Jochen Scholder, Waldkirch (DE); Sebastian Schätzle, Waldkirch (DE)

(73) Assignee: SICK AG, Waldkirch (DE)

( * ) Notice: Subject to any disclaimer, the term of this patent is extended or adjusted under 35 U.S.C. 154(b) by 122 days.

(21) Appl. No.: 18/383,184

(22) Filed: Oct. 24, 2023

(65) Prior Publication Data
US 2024/0142027 A1    May 2, 2024

(30) Foreign Application Priority Data

Oct. 27, 2022 (DE) .......................... 102022128514.6

(51) Int. Cl.
*F16L 15/00* (2006.01)
*G01D 11/00* (2006.01)

(52) U.S. Cl.
CPC ............ *F16L 15/006* (2013.01); *G01D 11/00* (2013.01)

(58) Field of Classification Search
CPC ....... F16L 41/008; F16L 21/04; F16L 21/045; F16L 19/10; G01D 11/00; G01D 11/245;
(Continued)

(56) References Cited

U.S. PATENT DOCUMENTS

2008/0271548 A1* 11/2008 Janz .................. G01D 11/30
73/866.5

2016/0053925 A1* 2/2016 Dohi .................. F16L 21/04
285/337
(Continued)

FOREIGN PATENT DOCUMENTS

DE    102016008419 A1    1/2018
DE    102016114565 A1    2/2018
(Continued)

OTHER PUBLICATIONS

Communication received from the German Patent Office dated Jun. 22, 2023 corresponding to application No. 102022128514.6.
(Continued)

*Primary Examiner* — David Bochna
(74) *Attorney, Agent, or Firm* — Nath, Goldberg & Meyer; Jerald L. Meyer; Stanley N. Protigal

(57) ABSTRACT

A process connection, in particular for a sensor unit in a process plant, includes an external threaded adapter that has a screw-in passage and that is provided with an internal thread; an internal threaded adapter having a cylindrical through passage and an external thread; and an annular molded seal. The external threaded adapter has a radially peripheral inwardly projecting hollow cylindrical projection at one end of the screw-in passage. The annular molded seal contacts the hollow cylindrical projection in the axial and radial direction within the screw-in passage. The external thread of the internal threaded adapter is in screw engagement with the internal thread of the external threaded adapter. The internal threaded adapter is configured to press the molded seal axially onto the hollow cylindrical projection of the external threaded adapter. The disclosure also relates to a sensor assembly having such a process connection and to a corresponding process plant.

31 Claims, 5 Drawing Sheets

(58) Field of Classification Search
CPC .... G01D 11/246; G01D 11/30; G01D 11/305; G01D 11/26
See application file for complete search history.

(56) References Cited

U.S. PATENT DOCUMENTS

2020/0166386 A1* 5/2020 Hoffmann .............. G01D 11/30
2021/0190620 A1* 6/2021 Kreis ................... G01D 11/245
2022/0099516 A1* 3/2022 Holm .................... G01D 11/26

FOREIGN PATENT DOCUMENTS

| DE | 102016122889 A1 | 5/2018 |
| DE | 102019122624 B3 | 9/2020 |
| EP | 3783248 A1 | 2/2021 |
| EP | 3783248 B1 | 1/2022 |
| WO | 2018099666 A1 | 6/2018 |

OTHER PUBLICATIONS

Search Report issued on Mar. 11, 2024 for application No. EP23204764.7.

* cited by examiner

PROCESS CONNECTION, SENSOR ASSEMBLY AND PROCESS PLANT

FIELD

The present invention relates to a process connection, in particular for a sensor unit in a process plant, a sensor assembly having such a process connection, and a process plant having at least one corresponding sensor assembly and/or at least one corresponding process connection.

BACKGROUND

Process connections generally serve to connect specific units, such as sensor units and/or control units, to process plants. Such process connections are in particular provided for inserting measurement probes of corresponding sensor units through openings in lines into the largely closed system of the process plant.

In this respect, it is always necessary to configure the process connection such that no leakage occurs at the corresponding process connection, and in particular between the measurement probe and the process connection, in the assembled sate. In particular in the food industry, the so-called bacterial tightness must be fulfilled in this respect. A system with a leakage rate in the order of $10^{-4}$ mbar*l/s is considered "bacteria-tight".

SUMMARY

It is therefore the underlying object of the invention to provide a process connection with which the bacteria-tight insertion of a measurement probe of a sensor unit into a corresponding process plant is possible in a robust and reliable manner.

In accordance with the present invention, a process connection, in particular for a sensor unit in a process plant, comprises an external threaded adapter that has a screw-in passage and that is provided with an internal thread; an internal threaded adapter having a cylindrical through passage and an external thread; and an annular molded seal. The external threaded adapter has a radially peripheral inwardly projecting hollow cylindrical projection at one end of the screw-in passage. The annular molded seal contacts said hollow cylindrical projection in the axial and radial direction within the screw-in passage of the external threaded adapter. The external thread of the internal threaded adapter is in screw engagement with the internal thread of the external threaded adapter. The internal threaded adapter is configured to press the molded seal axially onto the hollow cylindrical projection of the external threaded adapter.

In this respect, the term "hollow cylindrical" is not intended to preclude the projection from having a rounding, a chamfer, or a step between one of its top surfaces and its inner periphery. Also, it should not necessarily be ruled out that the inner periphery has smaller recesses and/or projections. In this respect, embodiments are also possible in which an axial length of the hollow cylindrical projection is greater than or equal to its inner diameter. A hollow cylindrical projection having an axial length that is smaller than its inner diameter and in particular disk-shaped designs for the hollow cylindrical projection are preferred, however. It is important in this respect that the hollow cylindrical projection extends substantially perpendicular or in a straight line along the longitudinal axis of the screw-in passage and the through passage that are aligned concentrically to one another. The opening of the hollow cylindrical projection in particular has a cross-section that substantially corresponds to a cross-section of the measurement probe to be inserted. For example, both cross-sections are circular, but other embodiments are also possible, for example having oval, square or otherwise polygonal cross-sections. The term "annular" is preferably to be understood as circular, but also includes other designs such as oval or polygonal shapes. In the present case, the axial direction and the radial direction refer to the longitudinal axis of the process connection that simultaneously also corresponds to the longitudinal axis of the through passage and the screw-in passage. The entire process connection, or at least individual components thereof, can in this respect be formed as largely rotationally symmetrical about said longitudinal axis.

In the assembled state of the process connection with an inserted sensor unit, the annular molded seal provided is merely pressed axially and substantially free of tension against the hollow cylindrical projection by the internal threaded adapter. Finally, the measurement probe to be inserted presses the molded seal substantially radially against the inner periphery of the hollow cylindrical projection. In this respect, the respective contact surfaces at the hollow cylindrical projection onto which the molded seal is pressed are clearly separated from one another (in particular by an upper edge of the hollow cylindrical projection). This enables a particularly robust and tight termination between the external threaded adapter and the measurement probe in the region of the hollow cylindrical projection.

To optimize the centering of the internal threaded adapter, and thus the measurement probe, in the process connection and thus the sealing effect of the molded seal, the internal threaded adapter preferably comprises, below its external thread (i.e. axially in the direction of the molded seal), an axially projecting cylindrical lug or prolongation that is received by a precisely fitting bore in the external threaded adapter. The cylindrical lug can preferably be in full peripheral contact with the bore in the external threaded adapter. The cylindrical lug and the external threaded adapter can in particular have a maximum spacing in the radial direction (i.e. a precision of fit) of less than 0.1 mm or less than 0.05 mm. The bore is preferably made concentric with the central longitudinal axis of the process connection. The through passage in the internal threaded adapter is again concentric with the cylindrical lug or prolongation.

Thus, the measurement probe is concentrically centered with respect to the molded seal. The precisely fitting seat of the measurement probe with respect to the through passage in the internal threaded adapter prevents the measurement probe from being displaced eccentrically with respect to the molded seal by acting forces (e.g. by dynamic pressure during throughflow measurements). The consequence of such a displacement would namely be an uneven pressing of the molded seal which is to be avoided.

The process connection preferably has a spacer ring that radially surrounds the molded seal in the interior of the external threaded adapter and likewise rests on the hollow cylindrical projection. The spacer ring is configured to limit a radial deformation of the molded seal during the pressing by the internal threaded adapter and/or the degree of the maximum axial pressing of the molded seal by the internal threaded adapter.

A maximum deformation of the molded seal is limited by this design, which, on the one hand, allows a better sealing and, on the other hand, leads to an increased durability and reliability of the molded seal.

In this respect, said spacer ring can be configured as an axially projecting projection of the internal threaded adapter or as a step at the hollow cylindrical projection.

Such an embodiment requires only a few individual components and is thus more user-friendly during assembly and maintenance.

Alternatively thereto, said spacer ring can be formed as a separate component from the internal threaded adapter, in particular in the form of a circular ring that surrounds the molded seal in the radial direction.

Thus, the spacer ring can be provided as a retrofit component and can be adapted even more flexibly to the respective use. The spacer ring can in particular be made of a material that differs from the material of the internal threaded adapter.

The process connection preferably has a thrust washer that is provided between the internal threaded adapter and the molded seal.

Said thrust washer acts as a separate force mediator between the internal threaded adapter and the molded seal and may in particular be made of a material that is chemically more compatible with the molded seal than the material of the internal threaded adapter. In particular, a previously described spacer ring is formed in one piece with the thrust washer in this respect.

The internal threaded adapter, the molded seal and the thrust washer are further preferably formed such that the friction between the molded seal and the thrust washer is greater than the friction between the internal threaded adapter and the thrust washer. The contact surface between the internal threaded adapter and the thrust washer is in particular configured as a sliding bearing. The one-piece formation of the spacer ring and the thrust washer results in a design with fewer individual components (compared to the separate design of these two components) and thus enables a more user-friendly assembly and maintenance.

This embodiment makes it possible to avoid a radially peripheral tensioning of the molded seal when it is pressed onto the hollow cylindrical projection by the internal threaded adapter by means of a screw movement. In other words, this embodiment serves to reduce a friction between the internal threaded adapter and the molded seal to the greatest possible extent so that the internal threaded adapter substantially only exerts axial forces on the molded seal. This increases the service life of the tensioned molded seal and the tightness of the process connection in the assembled state.

The internal threaded adapter, or—if provided—the thrust washer, preferably has an axially projecting fixing collar, which engages into the molded seal, along its inner periphery.

By further restricting the space for the molded seal, this embodiment allows a further increase in the tightness of the process connection in the assembled state, with the fixing collar simultaneously ensuring a centered or central positioning of the molded seal.

The difference in the height of the spacer ring from the collar height of said fixing collar is preferably less than or equal to 0.1 mm. The collar height of the fixing collar is in particular equal to the height of the spacer ring or is up to 5% or up to 10% or up to 15% (e.g. 0.1 mm) greater than the height of the spacer ring.

In tests, this size ratio of the collar height of the fixing collar and the height of the spacer ring has proven to be particularly preferred in order to obtain particularly robust and tight process connections.

The molded seal preferably has an annular main body having an inner diameter that is smaller than the inner diameter of the hollow cylindrical projection and having an outer diameter that is larger than the inner diameter of the hollow cylindrical projection. The main body in particular has a rectangular, square, oval or round cross-section in the relaxed state of the molded seal.

Due to the features mentioned, said main body is configured in a simple manner to rest on the hollow cylindrical projection in the interior of the external threaded adapter. Furthermore, a rectangular or square main body can in particular be pressed particularly easily between the hollow cylindrical projection of the external threaded adapter and the internal threaded adapter.

The fixing collar further preferably has an outer diameter that is less than or equal to the inner diameter of the main body of the molded seal.

The fixing collar is thereby prevented from exerting pressure in the axial direction on the main body of the molded seal and thus resulting in an unwanted tensioning of the molded seal.

The main body of the molded seal and the spacer ring are further preferably dimensioned such that the maximum axial deformation of the main body of the molded seal (i.e. its clamping dimension) is limited to 0.2 mm to 0.9 mm during the pressing by the internal threaded adapter.

This size range for the clamping dimension has proven to be particularly suitable for a reliable and in particular a bacteria-tight sealing (leakage rate in the order of $10^{-4}$ mbar*l/s).

Furthermore, the molded seal further preferably has a sealing collar, in particular a radially peripheral and preferably dovetail-shaped sealing collar, that projects into the opening in the interior of the hollow cylindrical projection. In the relaxed state of the molded seal, this sealing collar at least sectionally has a width that is greater than the difference between the inner diameter of the hollow cylindrical projection and the outer diameter of a measurement probe of a corresponding sensor unit to be guided through the process connection.

This enables a structurally comparatively simple and robust and very reliably sealing design of a region of the molded seal that is pressed radially against an inner wall of the hollow cylindrical projection of the external threaded adapter by the measurement probe. The main body of the molded seal is in particular rectangular in cross-section with rounded corners. The inner lower corner of the main body merges into the sealing collar. The sealing collar itself widens downwardly in the axial direction, but then terminates in a straight manner and in parallel with normals in the axial direction. Such a design has proven to be particularly robust and nevertheless tight in tests.

The diameter of the through passage of the internal threaded adapter, and—if provided—the inner diameter of the thrust washer and/or the fixing collar, is preferably equal to an outer diameter of a measurement probe of a corresponding sensor unit to be guided through the process connection.

A clearance of the individual components of the process connection with respect to the measurement probe is thereby reduced to the greatest possible extent, which results in a robust and reliable overall design.

The diameter of the external thread of the internal threaded adapter or the diameter of the internal thread of the external threaded adapter is preferably equal to the diameter of the external thread of the screw-in section of a screw-in connection of a sensor unit to be coupled to the process connection. The outer diameter of the spacer ring and/or the outer diameter of the thrust washer, if present, is in particular less than or equal to the above-mentioned diameter.

In other words, in the assembled state, a single internal thread of the external threaded adapter is in threaded engagement with both the external thread of the internal threaded adapter and the external thread of the screw-in section of the screw-in connection of the sensor unit. In this respect, the spacer ring and the thrust washer are in particular each movable along the screw-in passage into their installation position in the region of the hollow cylindrical projection. This design enables an overall design that is particularly easy to manufacture and assemble and that is also particularly robust.

The internal threaded adapter preferably has a peripheral groove in its interior, in which peripheral groove a centering ring, in particular in the form of an O-ring, is provided. Said centering ring has an inner diameter that is smaller than the outer diameter of a corresponding measurement probe and has an outer diameter that is larger than the diameter of the through passage of the internal threaded adapter.

This centering ring enables an even better centered guidance of the measurement probe through the through passage of the internal threaded adapter and in this respect results in further leakage protection between the measurement probe and the process connection.

The screw-in passage of the external threaded adapter preferably has a radially peripheral collection groove that is provided axially between the internal thread of the external threaded adapter and the hollow cylindrical projection and that projects radially beyond the internal thread of the external threaded adapter. The external threaded adapter further in particular has a radially extending drain passage that is connected to the collection groove.

The collection groove serves as a collection region for medium that has leaked past the molded seal and thus acts as a buffer in order, for example, to collect an "initialization leakage" that only occurs during the initial startup of the process plant. Through the preferably further provided drain passage, the respective medium can be led off from the collection groove and, if required, can be fed to a leakage sensor to empty the collection groove after a corresponding leakage and to be able to monitor the occurring leakage in this respect.

In accordance with the invention, a sensor assembly for a process plant comprises a sensor unit having a screw-in connection and a measurement probe that is guided through the screw-in connection and that has a measurement head. The sensor assembly according to the invention further comprises one of the process connections described above. The screw-in connection has a screw-in section having an external thread. The screw-in connection is screwed into the screw-in passage of the process connection with the external thread of the screw-in section from that end which is disposed opposite the hollow cylindrical projection of the external threaded adapter such that the measurement head of the measurement probe projects through the hollow cylindrical projection out of the process connection or at least terminates with it.

Such a sensor assembly can be integrated into a corresponding process plant in a particularly efficient and tightly terminating manner.

In accordance with the invention, a process plant comprises at least one previously described sensor unit and/or at least one previously described process connection.

Such a process plant benefits from the previously described advantages of the sensor assembly and/or process connections according to the invention.

BRIEF DESCRIPTION OF THE DRAWINGS

The invention will be described in the following by way of example with reference to the enclosed drawings. Here, it is shown.

DETAILED DESCRIPTION

Figure 1:
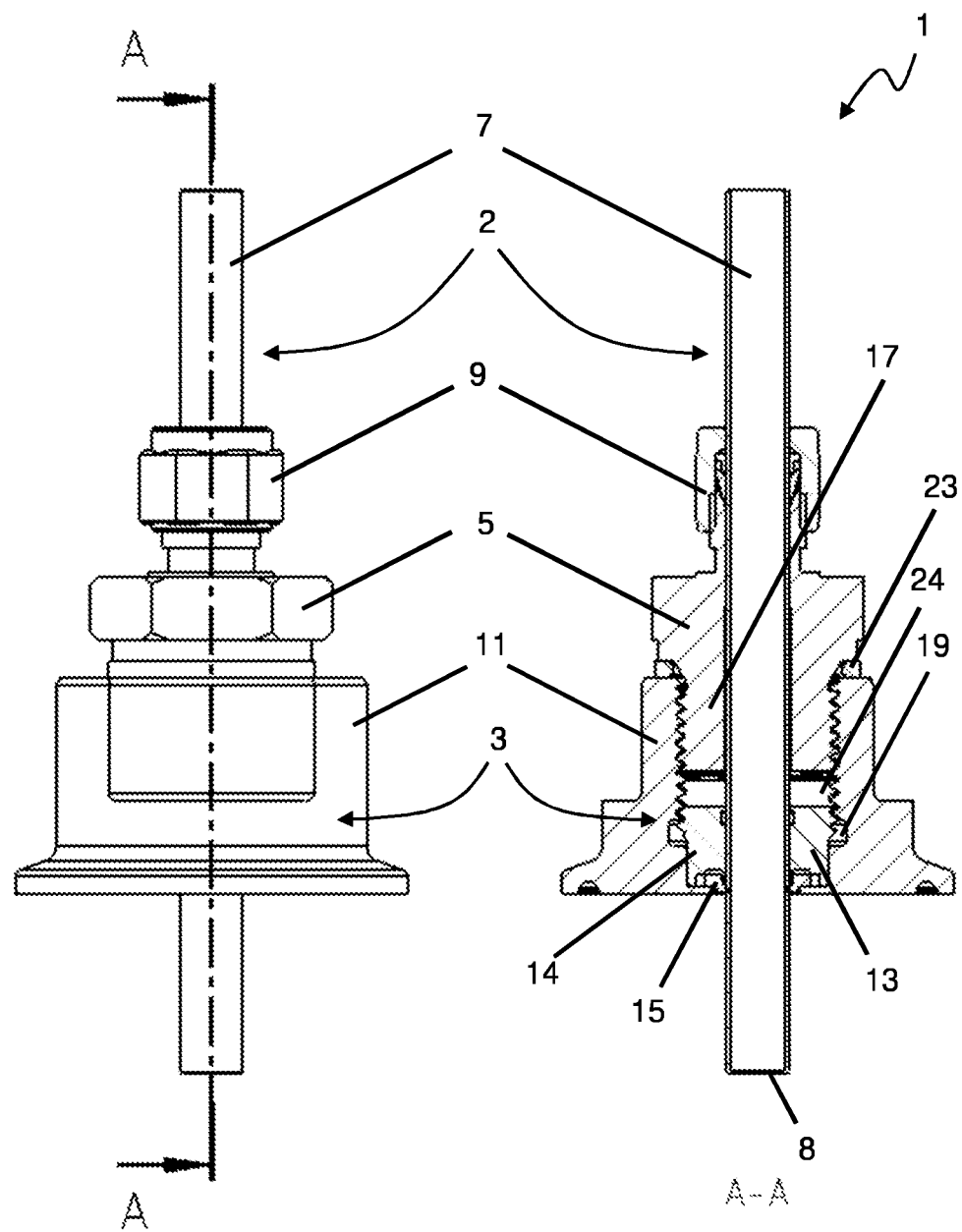
FIG. 1 a sensor assembly with a process connection in accordance with a first embodiment of the present invention, once in the side view (left) and once in cross-section (right)

FIG. 1 shows a first embodiment of a sensor assembly 1 comprising a sensor unit 2 and an exemplary process connection 3 in accordance with the present invention, both in side view (left) and in cross-section (right).

As can be seen here, the sensor unit 2 comprises a screw-in connection 5 and a measurement probe 7 guided through it. The measurement probe 7 is fixed in the screw-in connection 5 via suitable fixing means 9. The measurement probe 7 comprises a measurement head 8 that projects at the bottom from the process connection 3 in the embodiment shown. Alternatively thereto, the measurement head 8 can also only terminate with the process connection 3.

The process connection 3 comprises an external threaded adapter 11, an internal threaded adapter 13, and a molded seal 15. The external threaded adapter 11 surrounds a screw-in passage provided with an internal thread. The screw-in connection 5 comprises a screw-in section 17 having an external thread that is in engagement with the internal thread of the external threaded adapter. The internal threaded adapter 13 also has an external thread that is in engagement with the internal thread of the external threaded adapter 11. Both the screw-in connection 5 and the internal threaded adapter 11 are provided with a through passage through which the measurement probe 7 extends in the installed state.

To optimize the centering of the internal threaded adapter 13, and thus the measurement probe 7, in the process connection 3 and thus the sealing effect of the molded seal 15, the internal threaded adapter 13 comprises, below its external thread, an axially projecting cylindrical lug or prolongation 14 that is received by a precisely fitting bore in the external threaded adapter 11. This bore is made concentric with the central longitudinal axis of the process connection 3. The through passage in the internal threaded adapter 13 is again concentric with the cylindrical lug or prolongation 14. Thus, the measurement probe 7 is concentrically centered with respect to the molded seal 15. The precisely fitting seat of the measurement probe 7 with respect to the through passage in the internal threaded adapter 13 prevents the measurement probe 7 from being displaced eccentrically with respect to the molded seal 15 by acting forces (e.g. by dynamic pressure during throughflow measurements). The consequence of such a displacement would namely be an uneven pressing of the molded seal 15 which is to be avoided.

Figure 2:
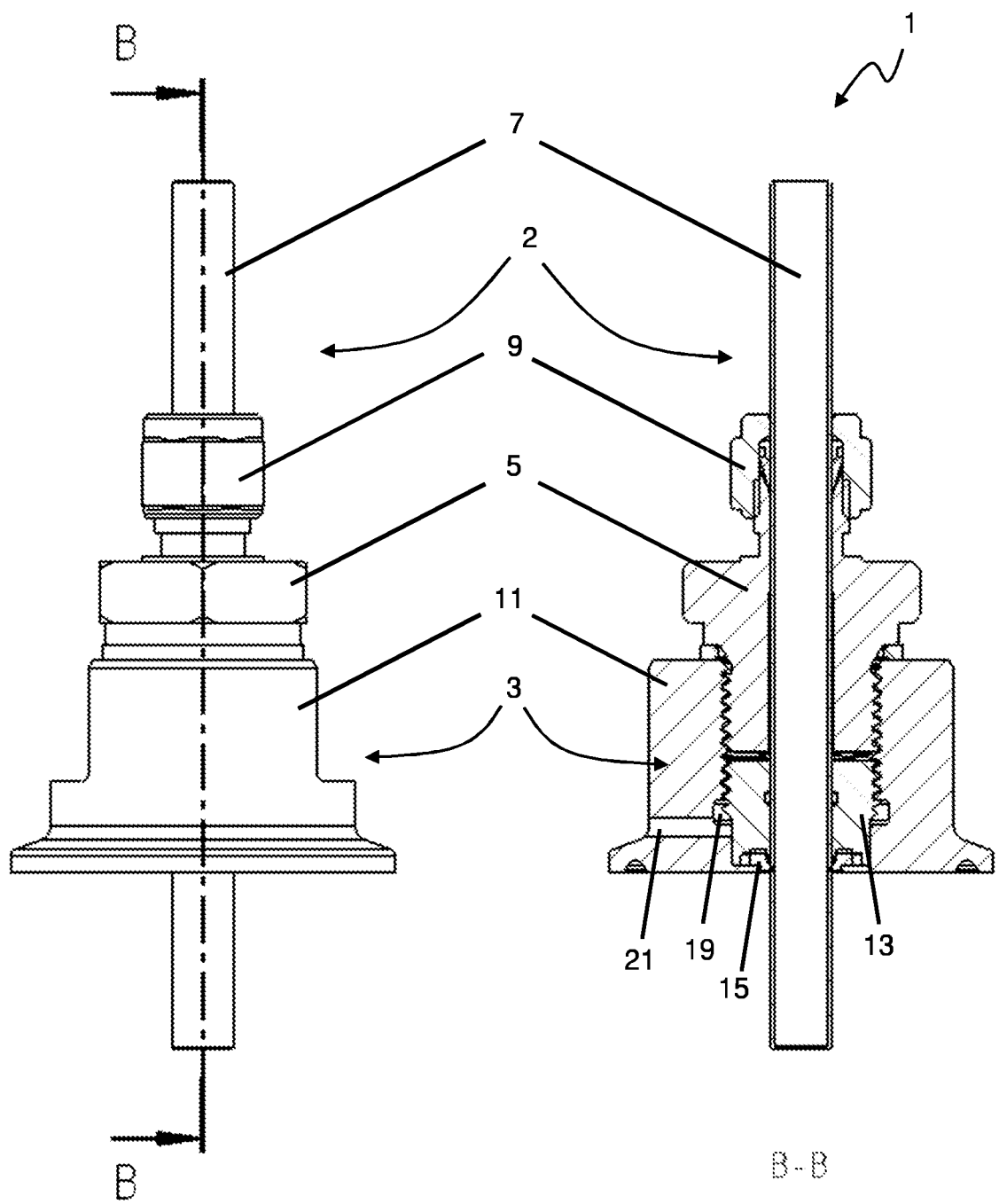
FIG. 2 a sensor assembly with a process connection in accordance with a second embodiment of the present invention, once in the side view (left) and once in cross-section (right)

As can be seen in the cross-sectional view (i.e. at the right in FIG. 1), the external threaded adapter 11 comprises a radially peripheral collection groove 19 between the region in which the molded seal 15 is provided and its internal thread. Said collection groove 19 serves to collect and at least temporarily store medium that has leaked through the molded seal 15 from the process plant. As shown in FIG. 2, this collection groove 19 can be connected to a drain passage 21. Said drain passage 21 serves to drain the medium from the collection groove 19 and, if necessary, to feed it to a separate leakage sensor (not shown).

As shown in FIGS. 1 and 2, a contact ring 23, in particular in the form of a further sealing ring, can be provided between the screw-in connection 5 and the external threaded adapter 11.

In addition to providing the drain passage 21 in the embodiment from FIG. 2, the only other significant difference between the embodiments of FIGS. 1 and 2 is that the internal threaded adapter 13 in FIG. 1 is shorter than the internal threaded adapter 13 in FIG. 2. This has the result that, in the embodiment of FIG. 1, a further collection region 24 is formed for medium that has leaked through the molded seal 15. This makes sense here primarily because of the lack of a drain passage 21 to increase the capacity for receiving medium that has leaked through the molded seal 15.

Figure 3:
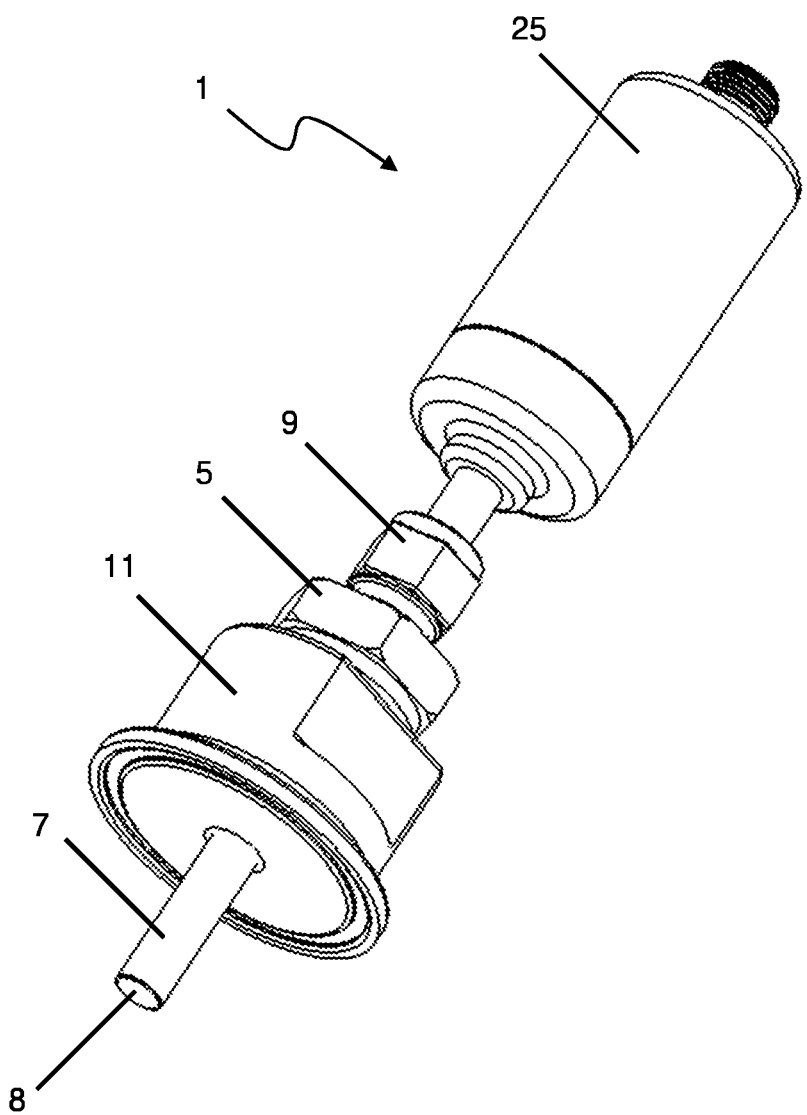
FIG. 3 a sensor assembly corresponding to one of FIGS. 1 and 2 with an additionally provided control and/or evaluation unit at the measurement probe.

As is further shown in FIG. 3, the sensor unit 1 can also comprise a control and/or evaluation unit 25 at the respective measurement probe 7. Suitable means for this purpose are well known and will therefore not be discussed in detail here.

The sensor assembly 1 shown in FIG. 1 in the region of the internal threaded adapter 13 will be described in detail in the following with reference to FIG. 4.

The external threaded adapter 11 comprises an inwardly directed radially peripheral hollow cylindrical projection 27 at its lower end. A main body 29 of the molded seal 15 that is square in cross-section is seated on said projection 27. The molded seal 15 itself is annular, in particular circular, in this respect. In addition to the main body 29, the molded seal 15 comprises a radially peripheral sealing collar 31 that is dovetail-shaped in cross-section and that engages into the hollow cylindrical projection 27.

The molded seal 15 is centered with respect to the hollow cylindrical projection 27, and thus with respect to the longitudinal axis of the process connection 3, by a fixing collar 33 that is formed as a component of the internal threaded adapter 13 in the present case. In addition to the fixing collar 33, the internal threaded adapter 13 is further formed here with a spacer ring 35 in the form of an axially projecting projection to spatially limit a deformability of the molded seal 15.

Furthermore, the internal threaded adapter 13 has a radially peripheral groove 37 in which a centering ring 39, in particular in the form of an O-ring, is provided.

The respective size relationships in the embodiment shown will be discussed in more detail in the following.

The internal thread of the external threaded adapter 11, the external thread of the internal threaded adapter 13 and the external thread of the screw-in section 17 of the screw-in connection 5 have the same thread diameter DG. Thus, only an internal thread with the constant thread diameter DG has to be formed in the external threaded adapter 11 to fix both the internal threaded adapter 13 and the screw-in connection 5 in it.

Figure 4:
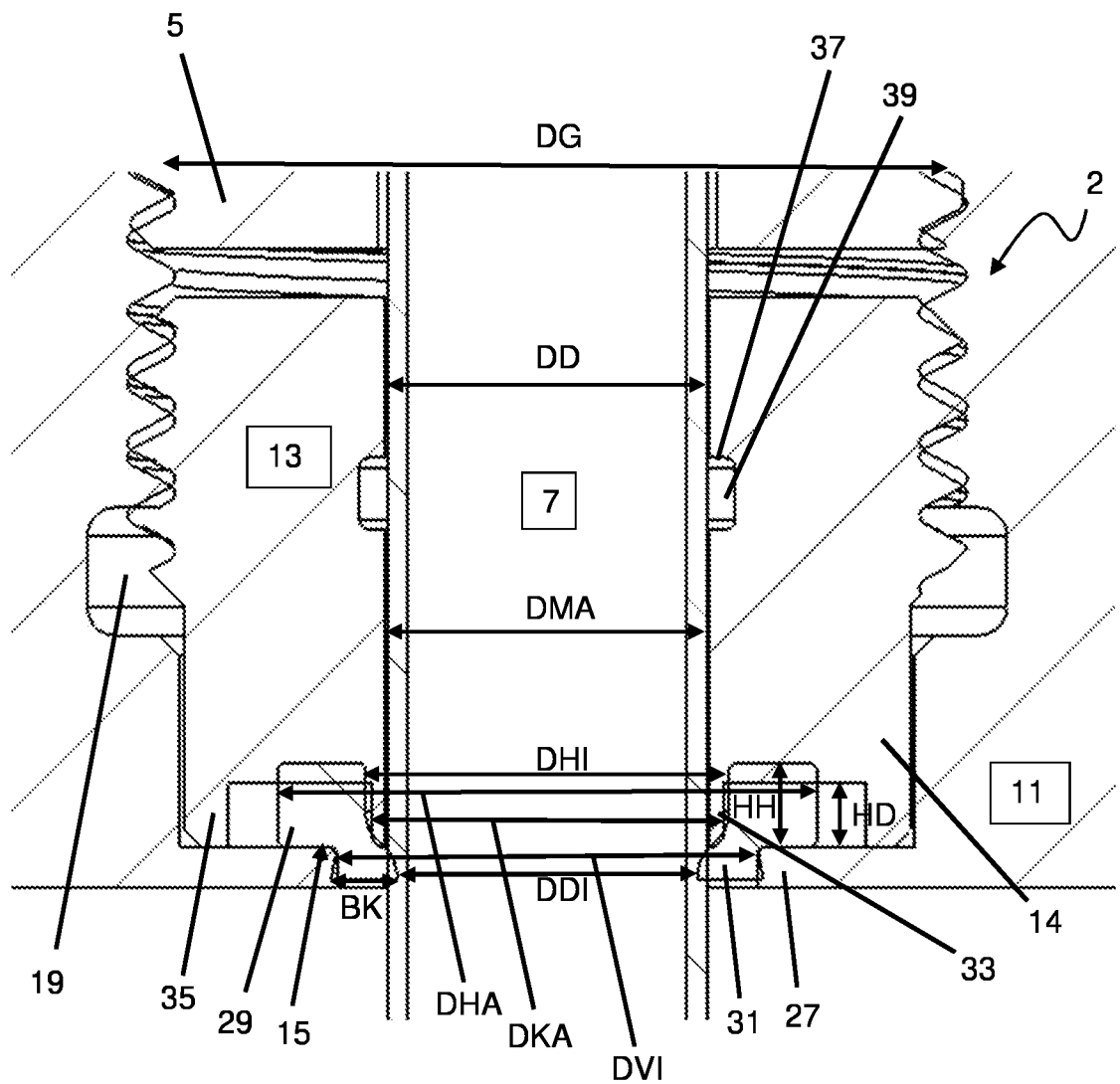
FIG. 4 a detailed view of the cross-section of the sensor assembly from FIG. 1 in the region of the internal threaded adapter.

In FIG. 4, the molded seal 15 is shown in its relaxed form, while the internal threaded adapter 13 is shown in its position pressing the molded seal 15 in order to clearly show the actual design of the molded seal 15 and simultaneously the compression dimension.

As already explained above, the molded seal 15 comprises the main body 29 and the sealing collar 31. The main body 29 contacts or rests on the hollow cylindrical projection 27 in the axial direction. For this purpose, the main body 29 has an inner diameter DHI that is smaller than the inner diameter DVI of the hollow cylindrical projection 27 and has an outer diameter DHA that is larger than the inner diameter DVI of the hollow cylindrical projection 27. For holding the molded seal 15, the fixing collar 33 has an outer diameter DKA that is less than or equal to the inner diameter DHI of the main body 29 of the molded seal 15. To optimize the tightness, the main body 29 of the molded seal 15 and the spacer ring 35 are dimensioned such that a maximum axial deformation, i.e. a clamping dimension, of the main body 29 of the molded seal 15 is limited to 0.2 mm to 0.9 mm. This can, for example, be achieved by the spacer ring 35 having a height HD that is 0.2 mm to 0.9 mm smaller than the height HH of the main body 29 of the molded seal 15. Furthermore, the difference between the height HD of the spacer ring 35 and the collar height HK of the provided fixing collar 33 is preferably less than or equal to 0.1 mm. The collar height HK of the fixing collar 33 is in particular equal to the height HD of the spacer ring 35 or up to 0.1 mm greater than the height HD of the spacer ring 35.

The outer diameter DHA of the main body 29 of the molded seal 15 is in this respect smaller than the inner diameter DDI of the spacer ring 35 to give the main body 29 of the molded seal 15 sufficient space for deformation during the pressing process by the internal threaded adapter 13.

As can further be seen from FIG. 4, the sealing collar 31 of the molded seal 15 has a width BK that is greater than the difference between the inner diameter DVI of the hollow cylindrical projection 27 and the outer diameter DMA of the measurement probe 7. Thus, the sealing collar 31 of the molded seal 15 is reliably and firmly pressed in the radial direction against the inner periphery DVI of the hollow cylindrical projection 27 by the measurement probe 7.

To be able to guide the measurement probe 7 through the process connection 3 with as small as possible a gap dimension, the through passage through the internal threaded adapter 13, the through passage through the screw-in connection 5, and the fixing collar 33 have a through passage diameter DD that corresponds to the outer diameter DMA of the measurement probe 7.

To be reliably clamped between the measurement probe 7 and the internal threaded adapter 13 in the assembled state of the sensor assembly 1, the centering ring 39 in the unclamped state has an inner diameter that is smaller than the outer diameter DMA of the measurement probe 7 and has an outer diameter that is larger than the through passage diameter DD.

An exemplary assembly of such a sensor assembly will be described in the following.

First, it is decided which sensor unit 2 is to be mounted at a provided opening of a process plant. Subsequently, a corresponding process connection 3, and in particular a corresponding external threaded adapter 11, is selected and mounted in a known manner to be as leak-tight as possible, in particular by means of bolts and/or screws and possibly a seal or a weld seam, at a corresponding opening of the process plant (not shown). The molded seal 15 is then inserted into the external threaded adapter 11 and into the hollow cylindrical projection 27. The internal threaded adapter 13 is thereafter screwed into the external threaded adapter 11 with the already preassembled centering ring 39 until the spacer ring 35 rests on the hollow cylindrical projection 27. This leads to a first axial pressing of the molded seal 15. Alternatively, the process connection 2 can already be preassembled, and in particular also pre-tensioned, before the assembly at the process plant.

Last but not least, the measurement probe 7 of the sensor unit 2 is inserted through the through passage of the internal threaded adapter 13 into the process connection 3 and is tightened therein by means of the screw-in connection 5. Finally, the measurement probe 7 presses the sealing collar 31 of the molded seal 15 in the radial direction against the hollow cylindrical projection 27. A particularly tight termination between the measurement probe 7 and the process connection 3 thereby takes place. In this respect, the through passages of the molded seal 15 and the internal threaded adapter 13 are matched in dimension and shape to the respective measurement probe 7 to optimize the tightness of the termination.

By pressing the molded seal 15 in several steps, i.e. first axially, then radially, a bacteria-tight termination is, for example, possible at process pressures of up to 16 bar and process temperatures between 10° C. and 110° C. At process pressures below 1 bar, a bacteria-tight termination is even e.g. possible at process temperatures of up to 150° C. For example, at a process pressure of 0.3 bar and a process temperature of 25° C., even a gasoline-tight and oil-tight termination (leakage rate in the range of $10^{-5}$ mbar*l/s) was demonstrated over a period of at least 15 minutes. The process pressures mentioned are not to be understood as real pressures in the present case, but rather as overpressures compared to the normal pressure.

A further embodiment for a process connection 3 according to the invention with a correspondingly inserted sensor unit 2 will be described in the following with reference to FIG. 5.

Since the embodiment shown here is similar in large parts to that from FIG. 4, each individual feature is not explicitly described again here, but reference is merely made to the corresponding statements from the previous section. Only the structural and functional differences from the embodiment shown in FIG. 4 are described in more detail.

Figure 5:
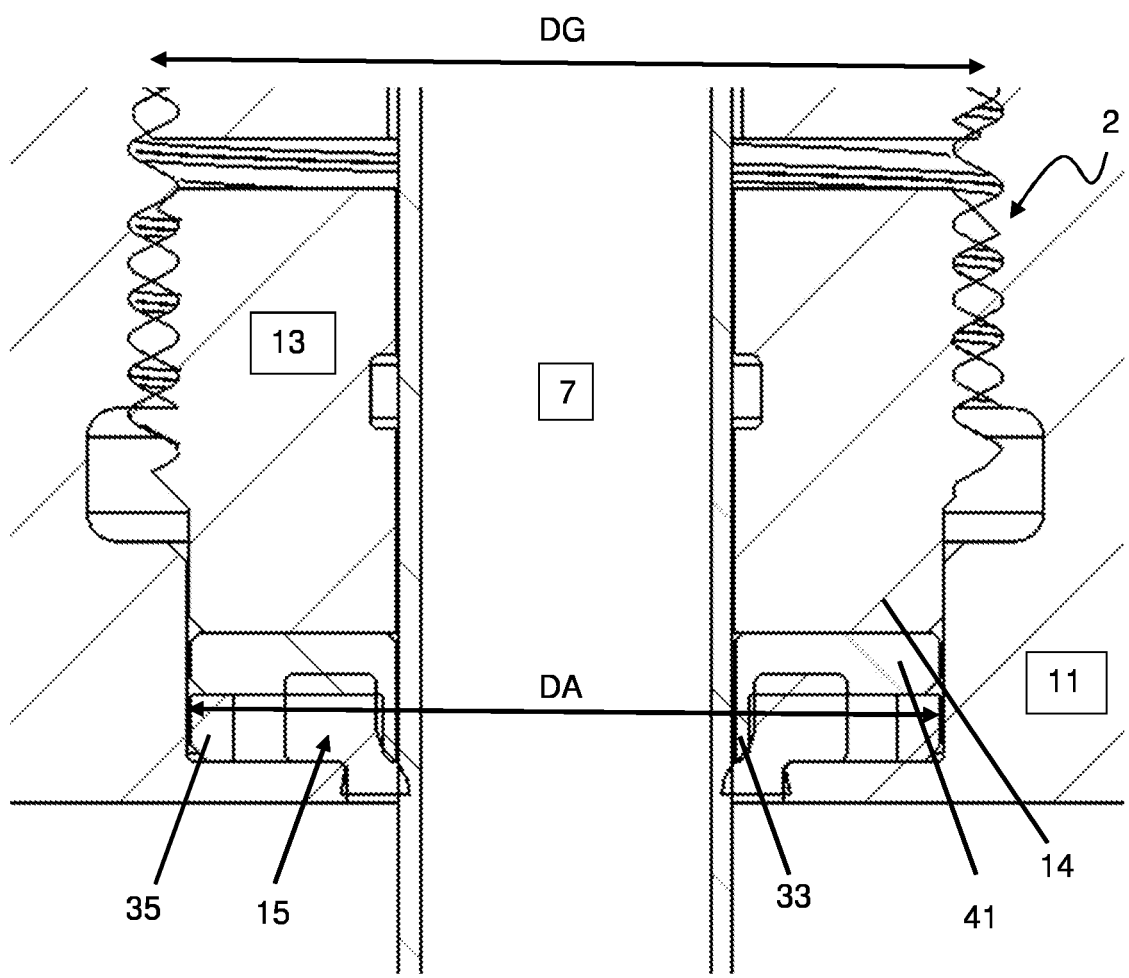
FIG. 5 a detailed view of a cross-section of a corresponding sensor assembly with an alternative embodiment according to the invention of the process connection.

The essential difference here is that in the embodiment shown in FIG. 5, the fixing collar 33 and the spacer ring 35 are not formed as components of the internal threaded adapter 13.

Specifically, the spacer ring 35 is formed here as an independent component separate from the internal threaded adapter 13 in the form of a radially peripheral ring.

The fixing collar 33 is formed as part of an independent thrust washer 41 that is separate from the internal threaded adapter 13 and that is positioned between the internal threaded adapter 13 and the molded seal 15. As shown, the spacer ring 35 is, for example, provided between the separate thrust washer 41 and the hollow cylindrical projection 27. Alternatively thereto, the spacer ring 35 can also be provided, radially surrounding the thrust washer 41, in contact with the internal threaded adapter 13 and the hollow cylindrical projection 27.

To avoid a radially peripheral tensioning of the molded seal 15 during the axial pressing of the molded seal 15 by the internal threaded adapter 13, a friction between the internal threaded adapter 13 and the thrust washer 41 is in particular set smaller than between the thrust washer 41 and the molded seal 15. The contact surface between the thrust washer 41 and the internal threaded adapter 13 in particular acts as a sliding bearing. Alternatively thereto, the contact surface between the thrust washer 41 and the molded seal 15 could, however, also have the lower friction and in particular act as a sliding bearing if required, wherein this design is more difficult to implement in terms of materials.

For a simplified assembly and formation of a robust overall system, the outer diameter DA of the thrust washer and in particular also of the spacer ring 35 is less than or equal to the thread diameter DG.

In addition to the two embodiments shown from FIGS. 4 and 5, mixed forms thereof are also conceivable. Specifically, for example, only the spacer ring 35 could be formed as a separate component from the internal threaded adapter 13, while the fixing collar 33 and possibly the thrust washer 41 are integrated into the internal threaded adapter.

Finally, in light of the above, it should be noted that the embodiments described are merely examples that do not limit the subject matter of the dependent claims in any way. Many variations and modifications are available to a skilled person that are encompassed by the scope of protection of the enclosed claims, but have not been explicitly described here.

REFERENCE NUMERAL LIST

1 sensor assembly
2 sensor unit
3 process connection
5 screw-in connection
7 measurement probe
9 fixing means
11 external threaded adapter
13 internal threaded adapter
14 cylindrical lug
15 molded seal
17 screw-in section
19 collection groove
21 drain passage
23 contact ring
24 further collection region
25 control and/or evaluation unit
27 hollow cylindrical projection
29 main body
31 sealing collar
33 fixing collar
35 spacer ring
37 groove
39 centering ring
41 thrust washer
BK sealing collar width
DA outer diameter
DD through diameter
DG thread diameter
DDI inner diameter of the molded seal
DHA main body outer diameter
DHI main body inner diameter
DKA outer diameter of the fixing collar
DMA measurement probe outer diameter
DVI projection inner diameter
HD spacer ring height
HH main body height

The invention claimed is:

1. A process connection, wherein the process connection comprises:
an external threaded adapter that has a screw-in passage and that is provided with an internal thread;
an internal threaded adapter having a cylindrical through passage and an external thread; and
an annular molded seal,
wherein the external threaded adapter has a radially peripheral inwardly projecting hollow cylindrical projection at one end of the screw-in passage,
wherein the annular molded seal contacts said hollow cylindrical projection in the axial and radial direction within the screw-in passage of the external threaded adapter,
wherein the external thread of the internal threaded adapter is in screw engagement with the internal thread of the external threaded adapter,
wherein the internal threaded adapter is configured to press the molded seal axially onto the hollow cylindrical projection of the external threaded adapter,
wherein the process connection has a thrust washer that is provided between the internal threaded adapter and the molded seal
wherein the process connection has a spacer ring that radially surrounds the molded seal in the interior of the external threaded adapter and rests on the hollow cylindrical projection,
and wherein the spacer ring is configured to limit a radial deformation of the molded seal during the pressing by the internal threaded adapter and/or the degree of the maximum axial pressing of the molded seal by the internal threaded adapter and wherein the spacer ring is formed in one piece with the thrust washer.

2. The process connection according to claim 1,
wherein the process connection is configured for a sensor unit in a process plant.

3. The process connection according to claim 1,
wherein the internal threaded adapter has an axially projecting cylindrical lug or prolongation below its external thread and a precisely fitting bore is provided in the external threaded adapter and receives said lug or prolongation,
wherein the bore in the external threaded adapter extends concentrically with the central longitudinal axis of the process connection and the through passage in the internal threaded adapter extends concentrically with the cylindrical lug or prolongation.

4. The process connection according to claim 1,
wherein said spacer ring is configured as an axially projecting projection of the internal threaded adapter or as a step at the hollow cylindrical projection.

5. The process connection according to claim 1,
wherein said spacer ring is formed as a separate component from the internal threaded adapter.

6. The process connection according to claim 5,
wherein said separate component is present in the form of a circular ring that surrounds the molded seal in the radial direction.

7. The process connection according to claim 1,
wherein the internal threaded adapter, the molded seal and the thrust washer are formed such that the friction between the molded seal and the thrust washer is greater than the friction between the internal threaded adapter and the thrust washer.

8. The process connection according to claim 7,
wherein the contact surface between the internal threaded adapter and the thrust washer is configured as a sliding bearing.

9. The process connection according to claim 1,
wherein the internal threaded adapter has an axially projecting fixing collar, which engages into the molded seal, along its inner periphery.

10. The process connection according to claim 1,
wherein the thrust washer has an axially projecting fixing collar, which engages into the molded seal, along its inner periphery.

11. The process connection according to claim 1,
wherein the molded seal has an annular main body having an inner diameter that is smaller than the inner diameter of the hollow cylindrical projection and having an outer diameter that is larger than the inner diameter of the hollow cylindrical projection.

12. The process connection according to claim 11,
wherein the main body has a rectangular, square, oval or round cross-section in the relaxed state of the molded seal.

13. The process connection according to claim 11,
wherein the internal threaded adapter has an axially projecting fixing collar, which engages into the molded seal, along its inner periphery and wherein the fixing collar has an outer diameter that is less than or equal to the inner diameter of the main body of the molded-seal (15) seal.

14. The process connection according to claim 11,
wherein the main body of the molded seal and the spacer ring are dimensioned such that a maximum axial deformation of the main body of the molded seal is limited to 0.2 mm to 0.9 mm during the pressing by the internal threaded adapter.

15. The process connection according to claim 11,
wherein the molded seal further has a sealing collar that projects into the opening in the interior of the hollow cylindrical projection,
wherein, in the relaxed state of the molded seal, this sealing collar at least sectionally has a width that is greater than the difference between the inner diameter of the hollow cylindrical projection and the outer diameter of a measurement probe to be guided through the process connection.

16. The process connection according to claim 15,
wherein the sealing collar is a radially peripheral sealing collar.

17. The process connection according to claim 11,
wherein the molded seal further has a sealing collar that projects into the opening in the interior of the hollow cylindrical projection,
wherein, in the relaxed state of the molded seal, this sealing collar at least sectionally has a width that is greater than the difference between the inner diameter of the hollow cylindrical projection and the outer diameter of a measurement probe to be guided through the process connection,
and wherein the sealing collar is a radially peripheral dovetail-shaped sealing collar.

18. The process connection according to claim 1,
wherein the diameter of the through passage of the internal threaded adapter, and the inner diameter of the thrust washer is equal to an outer diameter of a measurement probe to be guided through the process connection.

19. The process connection according to claim 1,
wherein the diameter of the external thread of the internal threaded adapter or the diameter of the internal thread of the external threaded adapter is equal to the diameter of the external thread of a screw-in section of a screw-in connection of a sensor unit to be coupled to the process connection.

20. The process connection according to claim 19,
wherein the outer diameter of the spacer ring and/or the outer diameter of the thrust washer is less than or equal to said thread diameter.

21. The process connection according to claim 1,
wherein the screw-in passage of the external threaded adapter has a radially peripheral collection groove that is provided axially between the internal thread of the external threaded adapter and the hollow cylindrical projection and that projects radially beyond the internal thread of the external threaded adapter.

22. The process connection according to claim 21,
wherein the external threaded adapter further has a radially extending drain passage that is connected to the collection groove.

23. A sensor assembly for a process system, comprising:
a sensor unit having a screw-in connection and a measurement probe that is guided through the screw-in connection and that has a measurement head; and
a process connection according to claim 1,
wherein the screw-in connection has a screw-in section having an external thread,
wherein the screw-in connection is screwed into the screw-in passage of the process connection with the external thread of the screw-in section from that end which is disposed opposite the hollow cylindrical projection of the external threaded adapter such that the measurement head of the measurement probe projects through the hollow cylindrical projection out of the process connection or at least terminates with it.

24. A process plant comprising at least one sensor assembly according to claim 23.

25. A process plant comprising at least one process connection according to claim 1.

26. A process connection, wherein the process connection comprises:
an external threaded adapter that has a screw-in passage and that is provided with an internal thread;
an internal threaded adapter having a cylindrical through passage and an external thread; and
an annular molded seal,
wherein the external threaded adapter has a radially peripheral inwardly projecting hollow cylindrical projection at one end of the screw-in passage,
wherein the annular molded seal contacts said hollow cylindrical projection in the axial and radial direction within the screw-in passage of the external threaded adapter,
wherein the external thread of the internal threaded adapter is in screw engagement with the internal thread of the external threaded adapter,
wherein the internal threaded adapter has an axially projecting fixing collar, which engages into the molded seal, along it inner periphery,
wherein the internal threaded adapter is configured to press the molded seal axially onto the hollow cylindrical projection of the external threaded adapter,
wherein the process connection has a spacer ring that radially surrounds the molded seal in the interior of the external threaded adapter and rests on the hollow cylindrical projection,
wherein the spacer ring is configured to limit a radial deformation of the molded seal during the pressing by the internal threaded adapter and/or the degree of the maximum axial pressing of the molded seal by the internal threaded adapter,
and wherein the difference in the height of the spacer ring from the collar height of said fixing collar is less than or equal to 0.1 mm.

27. The process connection according to claim 26
wherein the collar height of the fixing collar is equal to the height of the spacer ring or is up to 15%, greater than the height of the spacer ring.

28. A process plant comprising at least one process connection according to claim 26.

29. A process connection, wherein the process connection comprises:
an external threaded adapter that has a screw-in passage and that is provided with an internal thread;
an internal threaded adapter having a cylindrical through passage and an external thread; and
an annular molded seal,
wherein the external threaded adapter has a radially peripheral inwardly projecting hollow cylindrical projection at one end of the screw-in passage,
wherein the annular molded seal contacts said hollow cylindrical projection in the axial and radial direction within the screw-in passage of the external threaded adapter,
wherein the external thread of the internal threaded adapter is in screw engagement with the internal thread of the external threaded adapter,
wherein the internal threaded adapter is configured to press the molded seal axially onto the hollow cylindrical projection of the external threaded adapter,
wherein the internal threaded adapter has a peripheral groove in its interior, in which peripheral groove a centering ring is provided,
and wherein said centering ring has an inner diameter that is smaller than the outer diameter of a corresponding measurement probe and has an outer diameter that is larger than the diameter of the through passage of the internal threaded adapter.

30. The process connection according to claim 29, wherein the centering ring is in the form of an O-ring.

31. A process plant comprising at least one process connection according to claim 29.

* * * * *